United States Patent
Lien et al.

(10) Patent No.: US 6,682,786 B1
(45) Date of Patent: Jan. 27, 2004

(54) LIQUID CRYSTAL DISPLAY CELL HAVING LIQUID CRYSTAL MOLECULES IN VERTICAL OR SUBSTANTIALLY VERTICAL ALIGNMENT

(75) Inventors: Shui-Chih Alan Lien, Briarcliff Manor, NY (US); Alessandro C. Callegari, Yorktown Heights, NY (US); Paul S. Andry, Mohegan Lake, NY (US); Praveen Chaudhari, Briarcliff Manor, NY (US); James A. Lacey, Mahopac, NY (US); Sampath Purushothaman, Yorktown Heights, NY (US); James P. Doyle, Bronx, NY (US); Eileen A. Galligan, Fishkill, NY (US); Richard A. John, Yorktown Heights, NY (US); John J. Ritsko, Mt. Kisko, NY (US); Yuhichi Momoi, Kamakura (JP); Christopher Jahnes, Upper Saddle River, NJ (US)

(73) Assignee: IBM Corporation, Armonk, NY (US)

( * ) Notice: Subject to any disclaimer, the term of this patent is extended or adjusted under 35 U.S.C. 154(b) by 0 days.

(21) Appl. No.: 09/455,671

(22) Filed: Dec. 7, 1999

(51) Int. Cl.$^7$ .......................... G02F 1/1337; C09K 19/56
(52) U.S. Cl. ..................... 428/1.21; 428/1.51; 349/123; 349/124; 427/122; 423/446
(58) Field of Search ................. 428/1.2, 1.21, 428/1.25, 1.27, 1.51, 195.1, 697, 699, 702, 349, 694 BF, 694 TF; 423/44.6; 349/123, 124; 427/122

(56) References Cited

U.S. PATENT DOCUMENTS

| | | | | |
|---|---|---|---|---|
| 4,153,529 A | * | 5/1979 | Little et al. .................. | 204/192 |
| 5,319,479 A | * | 6/1994 | Yamada et al. ............... | 359/58 |
| 5,343,318 A | * | 8/1994 | Basturk ....................... | 359/75 |
| 5,623,354 A | | 4/1997 | Lien et al. ................... | 394/124 |
| 5,637,253 A | * | 6/1997 | Sato et al. ............. | 252/299.01 |
| 5,770,826 A | | 6/1998 | Chaudhari et al. ..... | 204/157.15 |
| 5,795,629 A | | 8/1998 | Harada et al. ................. | 428/1 |
| 6,033,979 A | * | 3/2000 | Endo ......................... | 438/622 |
| 6,061,114 A | * | 5/2000 | Callegari et al. ........... | 349/125 |
| 6,061,115 A | * | 5/2000 | Samant et al. .............. | 349/129 |
| 6,195,235 B1 | * | 2/2001 | Boutaghou et al. ....... | 360/235.2 |
| 6,312,766 B1 | * | 11/2001 | Pai et al. .................... | 427/523 |

OTHER PUBLICATIONS deGennes et al., The Physics of Liquid Crystals, Clarendon Press (1993) pp. 109 and 161.

Togashi et al., "White and Taylor Type Guest Host Displays Without Scattering Effects Using the Tilted Boundary Conditions", Mol. Cryst. Liq. Cryst. vol. 59 (1981) pp. 117–123.

Ikeno et al., "Electrooptic Bistability of a Ferroelectric Liquid Crystal Device Prepared Using Polyimide Langmuir-Blodgett Orientation Films" vol. 27, No. 4, Apr., 1988, pp. L475–L476.

Nakamura et al., "Alignment of nematic liquid crystals on ruled grating surfaces", J. Appl. Phys. 52(1), Jan. 1981, pp. 210–218.

John L. Janning, "Thin film surface orientation for liquid crystals", Appl. Phys. Lett., vol. 21, No. 4 (1972) pp. 173–174.

Schadt et al., "Surface–Induced Parallel Alignment of Liquid Crystals by Linearly Polymerized Photopolymers", Jpn. J. Appl. Phys., vol. 31, (1992) pp. 2155–2164.

* cited by examiner

Primary Examiner—Harold Pyon
Assistant Examiner—Sow-Fun Hon
(74) Attorney, Agent, or Firm—Dilworth & Barrese LLP

(57) ABSTRACT

A liquid crystal display cell having liquid crystal molecules positioned in a vertical or a substantially vertical alignment is provided. The liquid crystal display cell includes at least two substantially homogeneous fluorinated alignment layers disposed on transparent electrodes; a liquid crystal layer of liquid crystal molecules disposed between the alignment layers; and, a means of applying voltage across the transparent electrodes. Methods for forming these liquid crystal display cells are also provided.

8 Claims, 5 Drawing Sheets

PECVD REACTOR

LIQUID CRYSTAL DISPLAY CELL HAVING LIQUID CRYSTAL MOLECULES IN VERTICAL OR SUBSTANTIALLY VERTICAL ALIGNMENT

BACKGROUND OF THE INVENTION

1. Field of the Invention

Novel liquid crystal display cells having liquid crystal molecules that are positioned in a vertical or substantially vertical alignment are described herein. More particularly, novel liquid crystal displays formed from substantially homogeneous alignment layers disposed on transparent electrodes with the alignment layers being made of a substantially homogeneous fluorinated material are described. Also described are methods for manufacturing the liquid crystal display cells.

2. Description of the Related Art

In general, a liquid crystal display (LCD) includes a liquid crystal layer containing liquids crystal molecules and a pair of substrates on either side of the liquid crystal layer. When the alignment of the liquid crystal molecules is changed, the optical refractive index of the liquid crystal layer is also changed. By utilizing the change in the refractive index, the LCD performs the display. Accordingly, it is important that the liquid crystal molecules are arranged as regularly as possible in the initial state.

Interactions between the liquid crystal molecules and the surfaces of the substrates between which the liquid crystal layer is formed frequently determine the orientation of the liquid crystal molecules. To regulate the orientation of the liquid crystal molecules, an alignment layer can be applied to each of the surfaces of the substrates which face the liquid molecules. There are generally two types of materials employed to form the alignment layer for regulating the alignment of the liquid crystal molecules. One type of materials used to form the alignment layer are inorganic materials such as, for example, oxides, inorganic silane, metals and metal complexes. The other type of materials are organic materials, e.g., a polyimide. Typically, the desired material is applied to the substrate, dried and cured to form the alignment layer.

The liquid crystal molecules are then aligned by inducing anisotropy on the surface of the alignment layer. Methods for introducing anisotropy on the surface include, for example, (1) rubbing as disclosed in deGennes et al., "The Physics of Liquid Crystals", Clarendon Press (1993), pp. 109 and 161; (2) stretching a polymer as disclosed in Aoyama et al., "Mol. Cryst. Liq. Cryst." (1981) pp. 72 and 127; (3) applying a Langmuir-Blodgett film as disclosed in Ikemo et al., Jpn. J. Appl. Phys., 27, L475 (1998); (4) providing a grating structure produced by microlithography as disclosed in Nakamura et al., J. Appl. Phys., 52, 210 (1981); (5) oblique angle deposition of $SiO_x$ as disclosed in Ienuing, Appl. Phys. Lett., 21, 173 (1982); and, (6) polarized UV radiation of polymer films as disclosed in Schadt et al., J. Appl. Phys., 31, 2155 (1992). These methods, except that of example (1), are impractical due to their complexity and/or cost for mass production.

Currently, the method most often employed in aligning the liquid crystal molecules in a liquid crystal display cell is a mechanical rubbing treatment. This method involves unidirectionally rubbing the surface of the alignment layer with, for example, a velvet or burnishing cloth, to generate a proper pretilt angle, e.g., from 1° to 5° from the substrate surface, of the liquid crystal molecules in the liquid crystal layer which are in contact with the alignment layer are all equal to each other. One such example of a liquid crystal display device formed from this method is U.S. Pat. No. 5,795,629 which describes a display device formed by (1) applying a non-homogeneous alignment layer to a substrate where the alignment layer is formed from a mixture of two or more polymers with one of the polymers containing fluorine or siloxane; (2) rubbing the alignment layer in one direction with a nylon cloth; (3) assembling the substrates together; and (4) filling the space between the substrates with a nematic liquid crystal to form a liquid crystal display device.

Several drawbacks are associated with this rubbing method. Firstly, debris is left on the surface of the alignment layer by the cloth during the rubbing process which can damage an otherwise clean room environment. Secondly, the vigorous rubbing may damage, e.g. scratch, the structure of the liquid crystal display cell. Thirdly, electrostatic discharging may influence the electronic circuitry below the alignment layer. Fourthly, stability and consistency of pretilt angles are difficult to achieve and control. Finally, rubbing, being a macroscopic process, does not readily lend itself to aligning liquid crystal molecules in different directions at the spatial size of a pixel, which is usually of the order of a hundred micrometers. This local alignment is desirable to obtain a multidomain structure, which significantly increases the angle of viewing of the display. Thus, the limited angle of viewing of current liquid crystal display cells is one of the limitations of this technology.

It would be desirable to provide a liquid crystal display cell having liquid crystal molecules that are positioned in a vertical or a substantially vertical alignment produced by a non-contact method, i.e., nonrubbing method, thereby overcoming the deficiencies of the prior art discussed above.

SUMMARY OF THE INVENTION

Novel liquid crystal displays formed from liquid crystals display cells for use in, e.g., television sets or personal computers, have been discovered. The novel liquid crystal display cells having liquid crystal molecules positioned in a vertical or a substantially vertical alignment include at least two substantially homogeneous alignment layers disposed on transparent electrodes with each alignment layer formed from a substantially homogeneous fluorinated material, a liquid crystal layer of liquid crystal molecules disposed between the alignment layers, and a means for applying voltage across the transparent electrodes.

In one embodiment, liquid crystal display cells used to make the liquid crystal display include at least a first and second substrate, transparent electrodes applied to opposite surfaces of the first and second substrates, an adhesion layer applied to a portion of each surface of the transparent electrodes, a fluorinated alignment layer applied to a portion of the adhesion layers, a liquid crystal layer of liquid crystal molecules disposed between the fluorinated alignment layers and a means for applying voltage across the transparent electrodes.

In another embodiment, a liquid crystal display cell is provided which includes a first and second substrate, transparent electrodes applied to opposite surfaces of the first and second substrates, a substantially homogeneous layer applied to a portion of each surface of the transparent electrodes, the exposed surface of the substantially homogeneous layer being fluorinated to provide a substantially homogeneous fluorinated alignment layer, a liquid crystal layer of liquid crystal molecules disposed between the alignment layers and a means for applying voltage across the transparent electrodes.

Methods for making the liquid crystal display cells possessing liquid crystal molecules positioned in a vertical alignment have also been discovered. In one method, a transparent electrode is applied to a portion of a surface of a first and second substrate, an adhesion layer is applied to a portion of each surface of the transparent electrodes, a fluorinated alignment layer is applied to a portion of the adhesion layers, and a liquid crystal layer of liquid crystal molecules is disposed between the alignment layers of the two substrates.

In a second method, a transparent electrode is applied to a portion of a surface of a first and second substrate, a substantially homogeneous layer is applied to a portion of each surface of the transparent electrodes, the substantially homogeneous layers are then fluorinated to provide a substantially homogeneous fluorinated alignment layer, and a liquid crystal layer of liquid crystal molecules is disposed between the alignment layers.

A method for providing a liquid crystal display cell having liquid crystal molecules positioned in a substantially vertical alignment has also been discovered. In the method the surface of at least one of the alignment layers in the foregoing liquid crystal display cells is exposed to an energy beam such as an ion beam to adjust the pretilt angle of the liquid crystal molecules vertically aligned with respect to the alignment surface to provide a liquid crystal display cell having liquid crystal molecules positioned in a tilted vertical alignment. The advantages of employing this method are (1) no contact is necessary for the alignment; (2) a low energy beam ensures that only the surface of the substantially homogeneous alignment layers are affected such that the number of radicals induced by broken bond are at a minimum which will avoid a charge build up when a voltage is applied across the liquid crystal display cell; (3) a large area uniform and parallel beams can be readily obtained; and, (4) energy beams are well known in the electronics manufacturing community such that compatibility with a clean room environment can be readily obtained.

The liquid crystal display cells and methods described herein advantageously permit the liquid crystal molecules to be positioned in a vertical or a tilted vertical alignment.

BRIEF DESCRIPTION OF THE DRAWINGS

Preferred embodiments of the invention are described below with reference to the drawings, which are described as follows.

DESCRIPTION OF THE PREFERRED EMBODIMENTS

Figure 1:
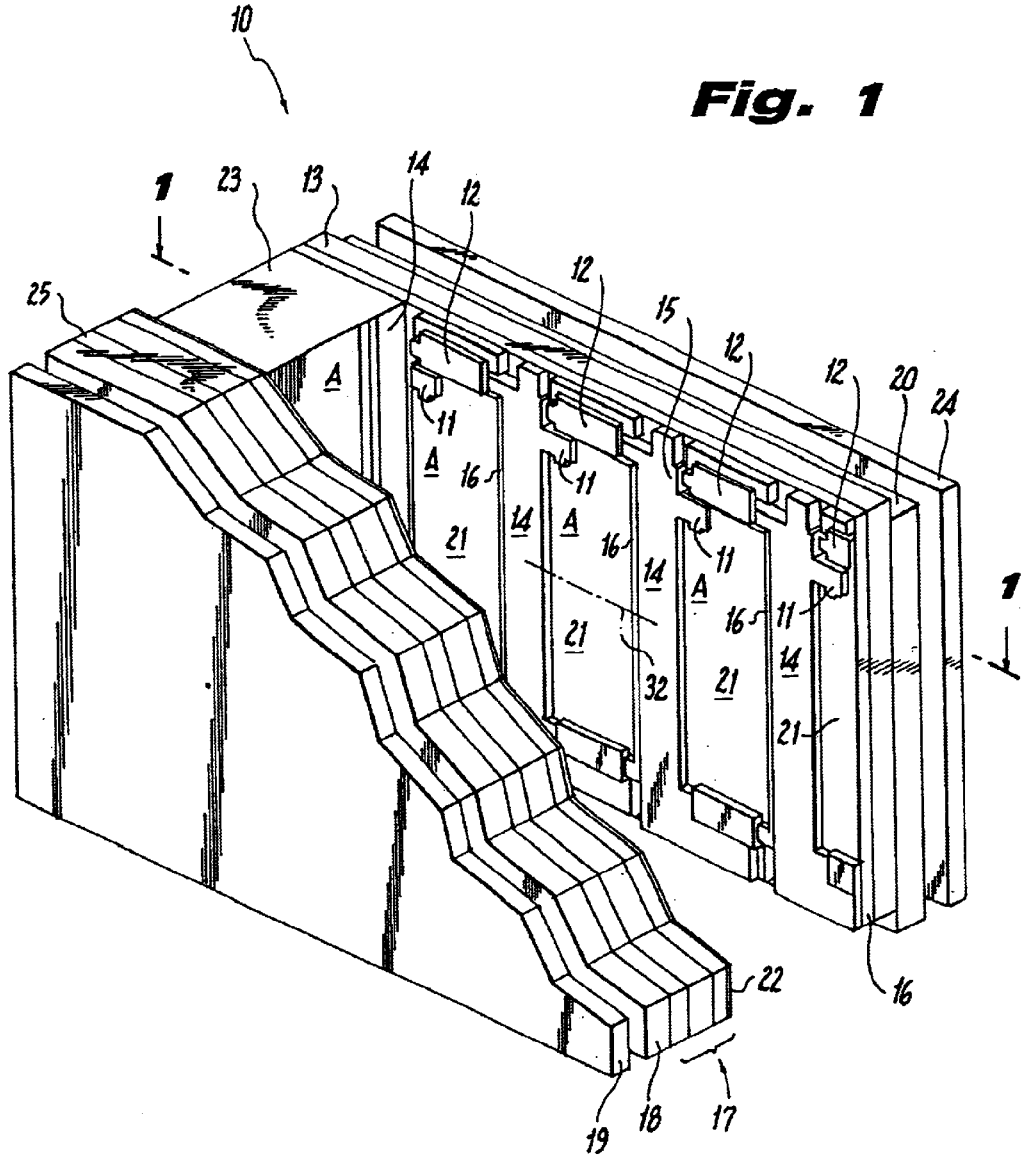
FIG. 1 is an enlarged partial perspective view of a liquid crystal display containing the liquid crystal display cells of this invention.

Although the present invention also is suitable for use in passive liquid crystal display, it will be described in embodiments of an active display and specifically a thin film transistor (TFT) liquid crystal display. As partially shown in FIG. 1, a TFT display 10 comprises an array of cells or pixels A, each cell including a thin film transistor 11 to address the cell by applying a voltage to the cell when the transistor is in its on state and a capacitor 12 which maintains the voltage after the transistor is switched off. The transistor is formed on a substrate 13, e.g., glass, on the backside of the display 10 and is connected between a column or data electrode 14 and a row electrode 15 and to a display transparent electrode 16 of each pixel, all at the back side of the display 10. The front side of the display 10 is formed with a continuous common transparent electrode 17 which is spaced apart from and positioned parallel to the transparent display electrode. Both the common electrode 17 and the display electrode 16 are preferably formed of a thin transparent conductive material, such as, for example, indium tin oxide (ITO), carried on a substrate. Since the display electrode of each pixel is smaller in dimensions than the continuous common electrode, a fringe field results which spread outward from the pixel or cell edges of the display electrode to the common electrode when voltage is applied across the electrode. Parallel with the outside of the common electrode 17 and adjacent glass substrate 18 is a polarizer 19, which is appropriately orientated relative the polarizer 20 mounted in back of the rear substrate 13. Alignment layers 21 and 22 are disposed on the inner surface of the display and common electrodes 16 and 17, respectively, and are in contact with a liquid crystal layer 23, herein twisted nematic liquid crystal molecules with a positive dielectric anisotrophy, which is sealed between the two parallel mounted substrate carrying the alignment layers 21 and 22. On the back side of the display 10 is a visible light source (not shown) which irradiates the display 10 through a diffuser 24. If it is desired to have the display 10 in color, a color filter 25 is disposed adjacent the pixels A to form a color cell.

In general, substrates 13 and 18 used in the liquid crystal display cell described herein can be any conventional type known to one skilled in the art, e.g., glass, plastic, etc. A preferred substrate for use herein is a glass substrate. Optionally, the substrates can be precleaned prior to applying the alignment layers 21 and 22 by any method known in the art, e.g., by rf plasma cleaning with a gas such as argon, hydrogen, nitrogen, oxygen or mixtures thereof which remove any residual particulates that may be on the substrate.

Figure 2:
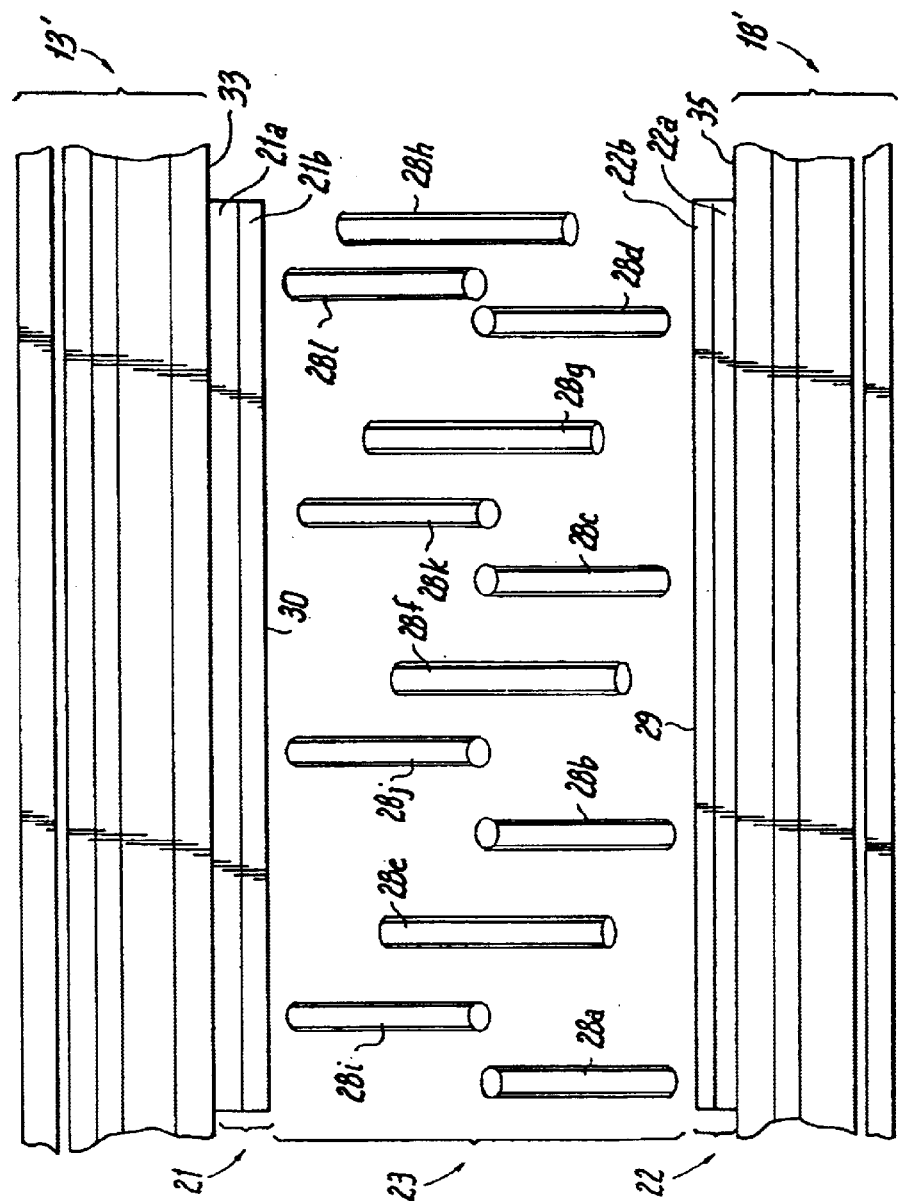
FIG. 2 is a cross-sectional view of a liquid crystal display cell having adhesion layers and fluorinated alignment layers with liquid crystal molecules positioned in a vertical alignment.

To illustrate a first embodiment of the present invention in more detail, FIG. 2 schematically shows a simplified, enlarged cross-section of the layers of a single domain cell or pixel of the liquid crystal display taken along line 1—1 of FIG. 1. FIG. 2 diagrammatically shows this liquid crystal layer 23 as elongated molecules, 28a, 28b, 28c, 28d, 28e, 28f, 28g, 28h, 28i, 28j and 28k in a vertical alignment between front alignment layer 22 and rear or back alignment layer 21 For convenience, front substrate 18 and the various components associated therewith (i.e., dawn color filter 25, polarizer 19, etc.) are simply shown as substrate assembly 18' in FIG. 2. Likewise, rear substrate 13 and the various components associated therewith (i.e., transparent electrode 16, polarizer 20, diffuser 24, etc.) are simply shown as substrate assembly 13' in FIG. 2.

Alignment layers 21 and 22 each include two layers in this first embodiment: namely, an adhesion layer (21a, 22a) adjacent the sustrate assembly and a fluorinated layer (21b, 22b) in contact with liquid crystal layer 23.

Adhesion layers 21a, 22a can be any carbon-containing material. Useful carbon-containing materials for use herein include, for example, diamond-like carbon and the like with diamond-like carbon being the preferred material. Adhesion layers 21a, 22a can be the same or different chemically, but it is preferred that both adhesion layers 21a, 22a be of the same composition.

To achieve suitable uniformity of thickness, adhesion layers 21a, 22a will normally be substantially planarized. Typically, the thickness of each adhesion layer can range from about 5 Å to about 40 Å, preferably from about 10 Å to about 30 Å and more preferably from about 15 Å to about 25 Å. PECVD or reactive sputtering can advantageously be used to form adhesion layers 21a, 22a. Techniques and parameters for forming the adhesion layers using these and other processes are within the purview of one skilled in the art.

Once adhesion layers 21a, 22a are formed, fluorinated alignment layers 21b, 22b are applied to adhesion layers 21a, 22a, respectively. Fluorinated alignment layers 21b, 22b advantageously provide a low surface energy such that upon depositing the liquid crystal layer 23, discussed hereinbelow, the liquid crystal molecules of liquid crystal layer 23 will be oriented in a vertical alignment. Thus, it is particularly advantageous that both fluorinated alignment layers 21b, 22b be of the same material to provide the same effect on the liquid crystal molecules. The fluorinated layers can be any fluorinated non-polymeric material. Suitable fluorinated non-polymeric materials include, for example, fluorinated diamond-like carbon and the like with fluorinated diamond-like carbon being preferred for use herein. Fluorinated diamond-like carbon alignment layers are considered novel. In particularly useful embodiments, the fluorinated diamond-like carbon alignment layers provide vertical alignment of liquid crystal molecules.

Layers 21b, 22b should also be substantially planarized. Thus, the thickness of each layer 21b, 22b will ordinarily range from about 10 Å to about 1000 Å, preferably from about 350 Å to about 600 Å and more preferably from about 400 Å to about 550 Å. As with the adhesion layers 21a, 22a, PECVD or reactive sputtering can be used to provide layers 21b, 22b. To provide the desired fluorination, however, a fluorine or fluoride containing gas is used in the deposition process. Techniques and parameters for forming fluorinated layers 21b, 22b using these or other processes are within the purview of one skilled in the art.

Once the fluorinated layers 21b, 22b have been applied to adhesion layers 21a, 22a, a liquid crystal layer 23 of liquid crystal molecules is then interposed between layers 21b, 22b by methods known in the art. For example, the liquid crystal layer can be applied to one of the fluorinated layers, say surface 30 of layer 21b and then the two substrate assemblies 13' and 18' bearing alignment layers 21, 22, respectively, are then assembled together employing techniques known in the art to form the liquid crystal display cell 10 having liquid crystal molecules in a vertical alignment as shown in FIG. 2.

Figure 3:
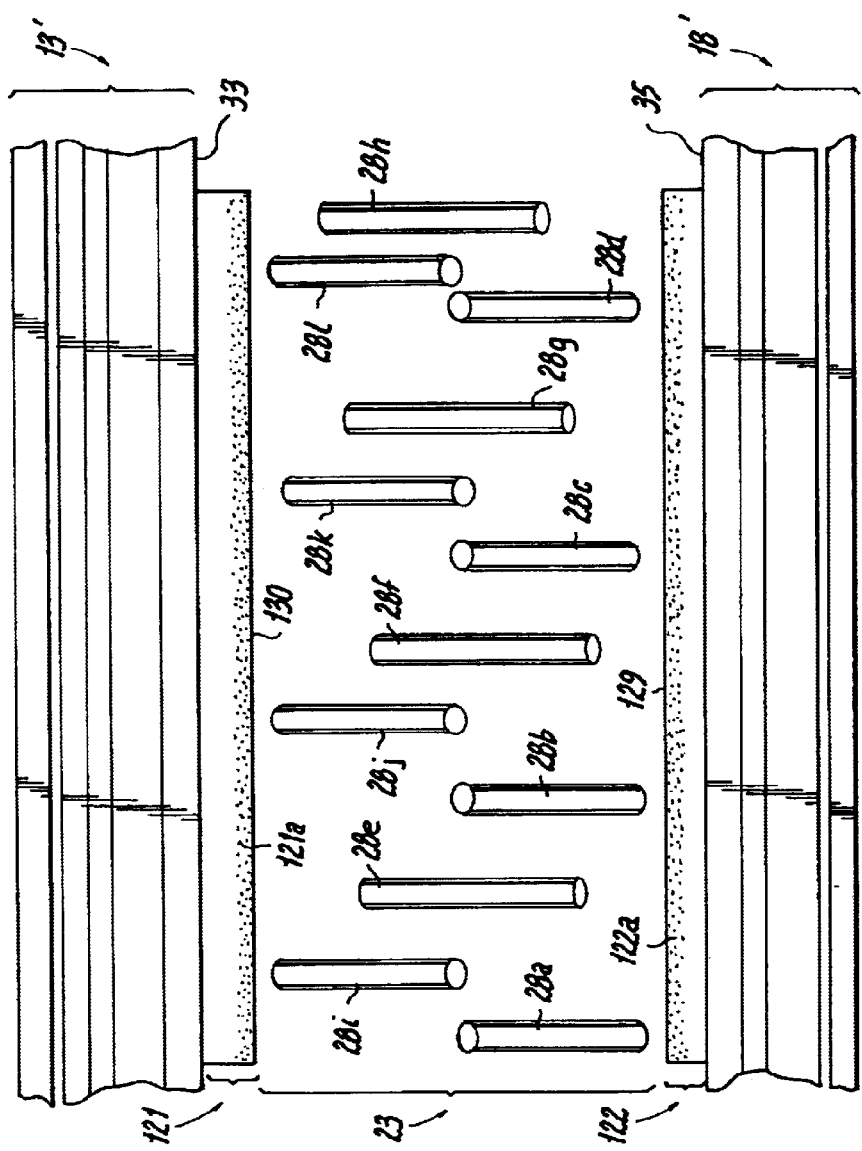
FIG. 3 is a cross-sectional view of a liquid crystal display cell having substantially homogeneous layers which have been fluorinated to provide fluorinated alignment layers and liquid crystal molecules positioned in a vertical alignment.
Figure 4:
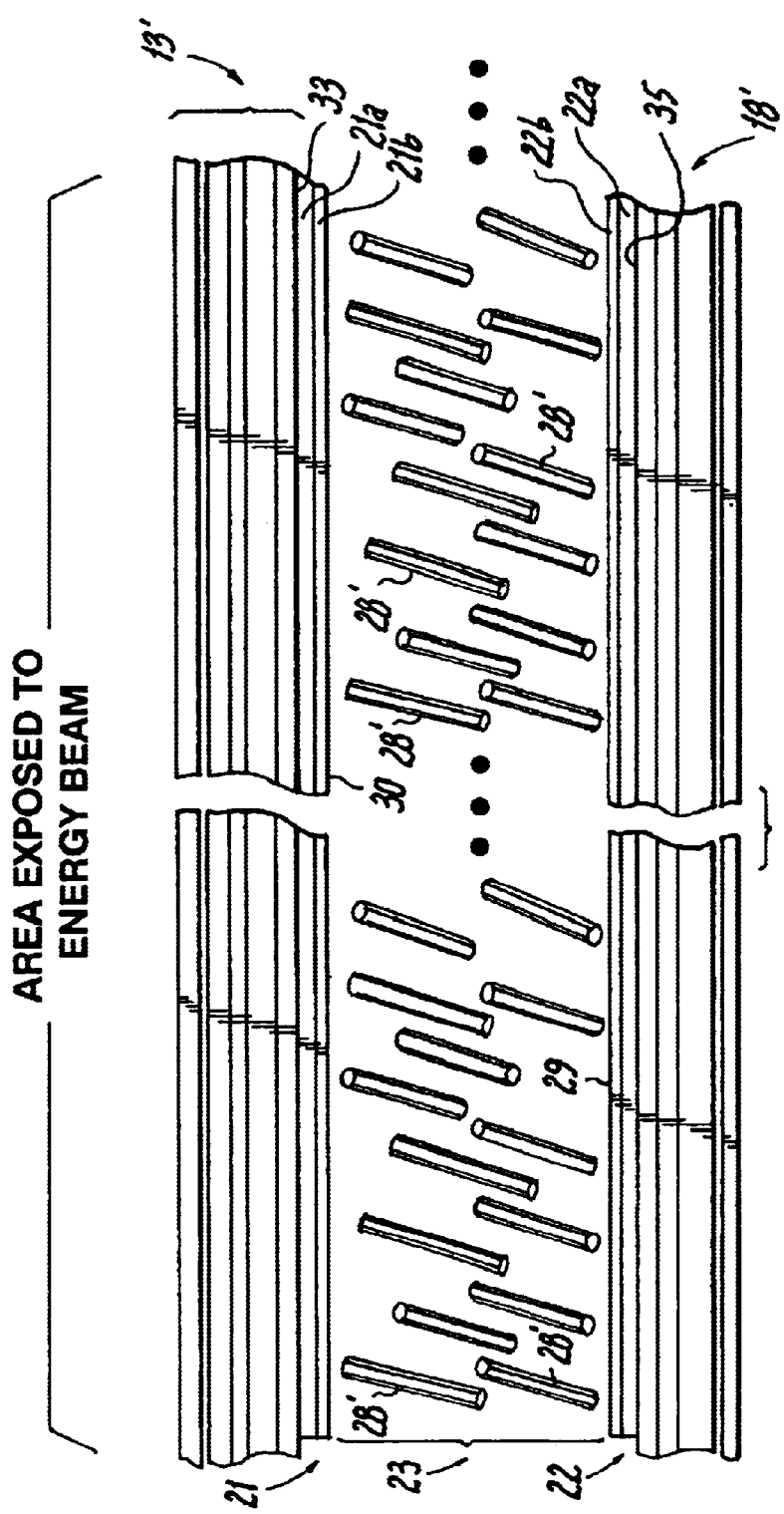
FIG. 4 is a cross-sectional view of the liquid crystal display cell of FIG. 2 with liquid crystal molecules positioned in a substantially vertical alignment after being exposed to an energy beam; and, FIG. 5 is a perspective view of the PECVD reactor employed in the examples herein.

A second embodiment of the liquid crystal display cell having liquid crystal molecules positioned in a vertical alignment in accordance with the present invention is shown generally in FIG. 3. As in the previous embodiment, the liquid crystal display cell includes substrates assemblies 13' and 18' having substantially homogeneous fluorinated alignment layers 121 and 122 applied to at least a portion of, lower surfaces 33 and 35 of substrate assemblies 13' and 18', respectively. Preferably, alignment layers 121 and 122 are applied to, and substantially coextensive with, substrate assemblies 13' and 18', respectively.

In this embodiment, however, rather than two layers of material, substantially homogeneous fluorinated alignment layers 121 and 122 are one single layer of a non-polymeric or a polymeric material that has been fluorinated after deposition. As a result, alignment layer 121 has a fluorinated zone 121a which is at and extends slightly below surface 130. Alignment layer 122 is likewise provided with a fluorinated zone 122a at and just below surface 129.

Suitable non-polymeric materials for use herein include diamond-like carbon and the like. Suitable polymeric materials for use herein include polyimides, polyamides, polyesters, polycarbonates, polyureas, polyethers, polyimidoamides, polypeptides, polyolefins, polyvinyls such as polystyrene, polyacrylates, polymethacrylates, polyamideimides, polyurethanes, silicon containing polymers, e.g., siloxane based polymers, and the like. A preferred material for use herein is diamond-like carbon. When forming alignment layers 121 and 122 the non-polymeric or polymeric materials can be chemically the same or different but it is preferred that both substantially homogeneous layers 121 and 122 be formed from the same material.

Fluorinated zones 121a, 122a advantageously provide a low surface energy to alignment layers 121, 122 such that upon depositing a liquid crystal layer 23 thereon, the liquid crystal molecules of liquid crystal layer 23 will be oriented in a vertical alignment (See FIG. 3). Thus, it is particularly advantageous that both fluorinated zones 121a, 122a be of the same material. The fluorinated zones 121a, 122a can be formed by employing techniques and parameters that are within the purview of one skilled in the art. For example, the fluorinated zones can be provided by exposing the non-polymeric or polymeric material used to form the homogeneous alignment layers to a fluorinated plasma. Suitable fluorine-containing plasma for use in forming the fluorinated zones on the previously deposited non-polymeric or polymeric material may be generated from a fluorine-containing gas such as, for example, $CF_4$, $CHF_3$, $SF_6$ and the like together with a small amount of $H_2$ if desired.

As in the previous embodiment, the alignment layers 121, 122 are preferably substantially planarized. Thus, the thicknesses of the alignment layers 121, 122 will ordinarily range from about 5 Å to about 200 Å.

Once the fluorinated zones 121a, 122a have been formed to provide fluorinated alignment layers 121, 122, a liquid crystal layer 23 of liquid crystal molecules 28a–l is then interposed therebetween by methods known in the art. The liquid crystal layer 23 can be formed from any conventional liquid crystal known in the art, e.g., negative dielectric anisotropic liquid crystals 95–465 or MLC-2039 both manufactured by E. Merck Darmstadt of Germany. The substrates assemblies 13' and 18' are then assembled together employing techniques known in the art to form the liquid crystal display cell having liquid crystal molecules interposed therebetween in a vertical alignment.

Liquid crystal display cells having vertically aligned liquid crystal molecules can be exposed to an energy beam such that at least a portion of the liquid molecules are positioned in a substantially vertical alignment, i.e., in tilted vertical alignment, instead of a vertical alignment (see FIG.

4). In general, to adjust the angle, i.e., tilt, of the liquid crystal molecules which have been oriented in a substantially vertical alignment, i.e., a vertical alignment as discussed above, one or more of the alignment layers 21, 22, 121 or 122 of liquid crystal display cell 10 is exposed to an energy beam, e.g., an ion beam, before application of the liquid crystal layer. Typically, the angle of the energy beam to the surface of the layer exposed thereto can range from about 5° to about 85° with respect to a normal from the plane of the alignment layer. The energy of the beam used to adjust the alignment of the liquid crystal molecules can range from about 25 eV to about 200 eV. The time period for exposing the surfaces to the energy beam can range from about 5 seconds to about 5 minutes. Features characterizing the energy beam alignment of liquid crystal molecules are disclosed in U.S. Pat. No. 5,770,826, the contents of which are incorporated by reference herein. By exposing the surface of either layer 21, 22, 121 or 122 of cell 10, the molecules positioned in a vertical alignment therein will be adjusted to an angle ranging from about 0.5° to about 20° and preferably from about 1° to about 5° from the substrate surface with respect to the normal to the plane defined by the alignment layer. As will be understood by those skilled in the art, the angle of the molecules will depend on the angle of the energy beam employed herein. Preferably, the alignment layers on both the front and near substrate assemblies are treated with an energy beam at the same angle to ensure regular alignment of the liquid crystal molecules located between the exposed portions of the alignment layers once the substrates are assembled to form the cell.

The following examples are illustrative of the present invention.

EXAMPLE 1

The following example illustrates the process of depositing a fluorinated carbon film on top of a thin non-fluorinated carbon film, i.e., an adhesion layer, onto a glass substrate coated with an ITO film, by PECVD of hydrogen/Hexafluorobenzene/acetylene/helium gas mixtures.

Figure 5:
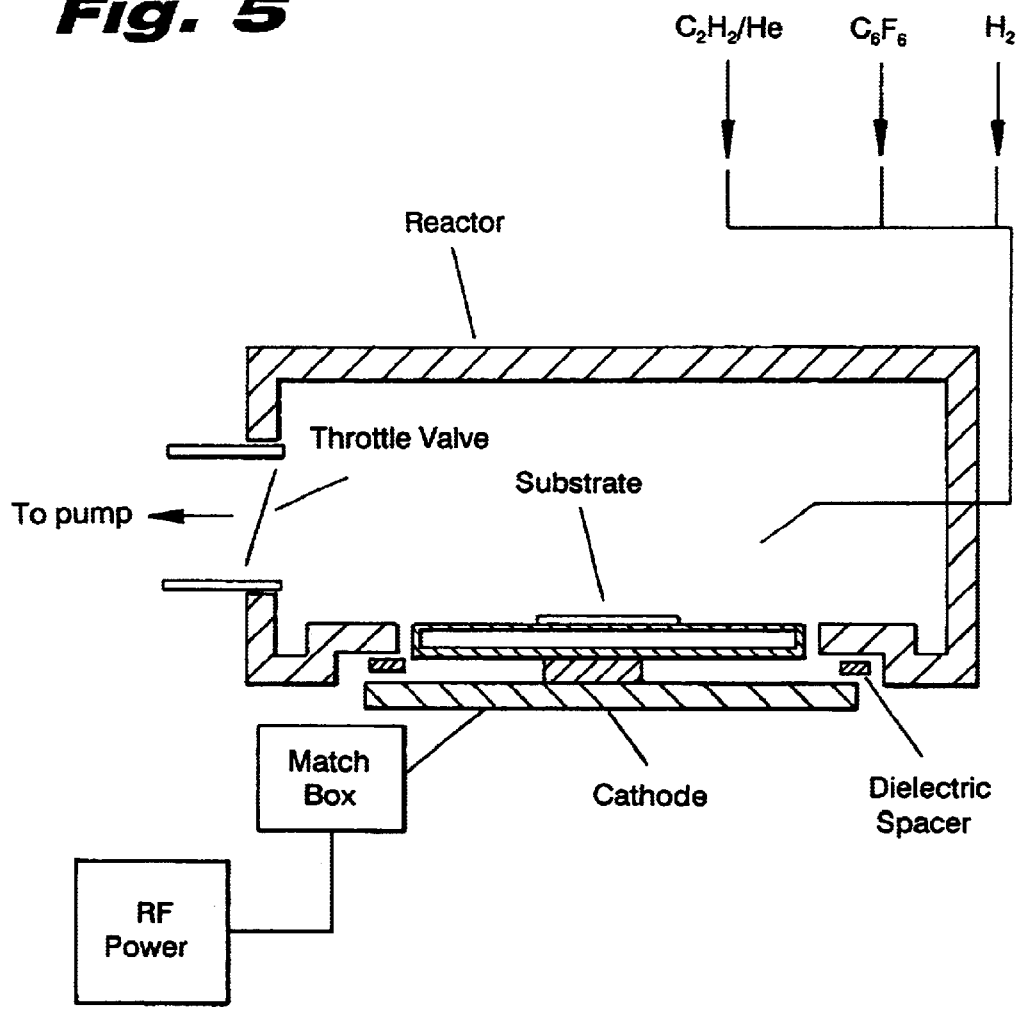

The experiment was carried out by first depositing an amorphous carbon film onto one inch square glass substrates coated with an ITO film. The substrates, which were already precleaned, were blow dried with filtered nitrogen gas to remove any residual particulate before being loaded on a cathode as shown in FIG. 5. Two substrates were loaded in this experiment because two identical films need to be used for liquid crystal display assembly. Next, the system was evacuated to a base pressure reading of about $1 \times 10^5$ Torr or lower. The thin amorphous carbon film used as an adhesion layer was deposited by PECVD from a mixture of acetylene-helium (5% in He)/hydrogen gas ($C_2H_2$/He) in a flow ratio of 25/15, respectively, at a gas pressure of 60 mTorr. Deposition time was 20 seconds with the film thickness being about 40 Å. Cathode power density was 77 mW/cm$^2$. Then, without breaking vacuum and keeping the same power density and flows used to deposit the thin carbon film right at the end of the 20 second deposition, hexafluorobenzene (HFB) vapors from a liquid source were let into the chamber at a flow rate of about 20 sccm. The deposition pressure was increased to about 64 mTorr. The fluorinated carbon film deposition time was 40 sec with the film thickness being about 485 Å. By introducing the hexafluorobenzene, a highly fluorinated amorphous carbon film was obtained. The film thickness was measured using a n&k Analyzer that is commercially available from n&k Technology Inc. (S. Clara, Calif.). The substrates were then unloaded from the reactor and ready for assembly. A summary of the process parameters used is set forth below in Table 1.

TABLE 1

| Sample | Film Structure* | H(sccm) | $C_2H_2$/He (sccm) | HFB (sccm) | Time (sec) | Film Thickness (Å) |
|---|---|---|---|---|---|---|
| 1 | DLC | 15 | 25 | 0 | 20 | |
|   | FDLC | 15 | 25 | 20 | 40 | 485 |
| 2 | DLC | 15 | 4 | 0 | 5 | |
|   | FDLC | 15 | 4 | 10 | 20 | 110 |
| 3 | DLC | 15 | 25 | 0 | 10 | |
|   | FDLC | 10 | 0 | 7.2 | 60 | 231 |
| 4 | DLC | 15 | 25 | 0 | 10 | |
|   | FDLC | 10 | 0 | 5.7 | 30 | 110 |

*DLC = diamond-like carbon and FDLC = fluorinated diamond-like carbon.

After the above treatment on these two substrates, using the conditions for Sample 4 in Table 1, 5 μm spacer balls were applied to the film surface of one substrate using a dry spacer applying machine. An edge seal pattern of ultraviolet (UV) light curable epoxy was applied to the film surface of the other substrate. Then the two substrates are assembled together and exposed to the UV light to cure the UV curable edge seal epoxy. The assembled panels were then filled with a Merck LC MILC-2039 without a chiral agent. Finally, the same UV curable epoxy was used to seal the LC filling port. This finished the panel assembly. When viewed under cross polarizers, the above test panel appeared black even when the test panel was rotated about the vertical axis which is normal to both the sample and polarizer's surface. This demonstrates that a vertical alignment was achieved. Additionally, when Samples 1 and 3 were viewed in the same manner as Sample 4, the test panels appeared black which demonstrated that vertical alignment was achieved.

EXAMPLE 2

The following example is given to illustrate the process of depositing a diamond-like carbon (DLC) film onto a glass substrate coated with an ITO film by PECVD in a RIE-type reactor using a mixture of hydrogen/acetylene/helium gases. The example further illustrates the surface of the DLC film can then be converted to a fluorinated surface (FDLC) by exposure to a second fluorinated plasma in the same reactor using $CF_4$ gas. The experiments were carried out by first depositing the DLC film onto ITO-coated glass substrates either one or two inches square. The substrates, which were already precleaned, were blown dried with filtered nitrogen gas to remove any residual particulates being loaded into the PECVD reactor. The substrates were loaded in pairs because two identical films are required for liquid crystal display cell assembly. The system was first evacuated to a base pressure reading of about $1 \times 10^{-5}$ Torr or lower by pumping the chamber for at least 10 minutes using a turbopump. The DLC film was deposited by PECVD from a gas flow mixture of 200 sccm 5% acetylene-in-helium and 50 sccm hydrogen gas, respectively, at a pressure of 200 mTorr and power density of 0.07 Watts/cm$^2$. The deposition time was 60 seconds with the film thickness being about 100 Å. Then, without breaking vacuum, a second plasma was initiated to convert the surface to a fluorinated one. This was accomplished by introducing 200 sccm of $CF_4$ into the reactor at a pressure of 100 mTorr. The plasma was run at a power density of 0.17 W/cm$^2$ and an exposure time of 30 seconds was used to create the surface layer. The substrates were then unloaded from the reactor and ready for assembly.

Following the above treatment on these two substrates, 5 μm spacer balls were then applied to the film surface of one substrate using a dry spacer applying machine. An edge seal pattern of ultraviolet (U&V) light curable epoxy was applied to the film surface of the other substrate. Then the two substrates were assembled together and exposed to the UV light to cure the UV curable edge seal epoxy. Next, the assembled panels were filled with a Merck LC MLC-2039 without a chiral agent. Finally, the same UV curable epoxy was used to seal the LC filling port. This finished the panel assembly. We checked the panel operation under cross polarizers as stated in Example 1 and it showed that a vertical alignment was achieved.

Although the invention has been described in its preferred form with a certain degree of particularity, obviously many changes and variations are possible therein and will be apparent to those skilled in the art after reading the foregoing description. It is therefore to be understood that the present invention may be presented otherwise than as specifically described herein without departing from the spirit and scope thereof.

What is claimed is:

1. A liquid crystal display formed with a plurality of liquid crystal display cells comprising:

at least two substantially planarized substantially homogeneous fluorinated alignment layers formed from a fluorinated diamond-like carbon disposed on transparent electrodes, wherein a surface of at least one of said alignment layers is exposed to a low energy beam;

a liquid crystal layer of liquid crystal molecules disposed in a vertical or a substantially vertical alignment between the fluorinated alignment layers; and, a means of applying voltage across the transparent electrodes.

2. The liquid crystal display of claim 1 wherein the transparent electrodes are formed from a transparent conducting oxide material.

3. The liquid crystal display of claim 2 where the transparent conducting oxide material is indium tin oxide.

4. The liquid crystal display of claim 1 wherein the thickness of each alignment layer is from about 10 Å to about 1,000 Å.

5. The liquid crystal display of claim 1 wherein the thickness of each alignment layer is from about 5 Å to about 200 Å.

6. The liquid crystal display of claim 1 wherein each alignment layer further comprises an adhesion layer.

7. The liquid crystal display of claim 6 wherein the adhesion layers are formed from a carbon-containing material.

8. The liquid crystal display of claim 7 wherein the carbon-containing material is diamond-like carbon.

* * * * *